United States Patent [19]
Johnstone

[11] Patent Number: 4,963,262
[45] Date of Patent: Oct. 16, 1990

[54] COFFEE FILTER PAPER RETAINER

[76] Inventor: Edna M. Johnstone, 3765 E. Smith Rd., Bellingham, Wash. 98226

[21] Appl. No.: 341,935

[22] Filed: Apr. 21, 1989

[51] Int. Cl.$^5$ ............................................. B01D 29/07
[52] U.S. Cl. ................................... 210/474; 210/477; 210/482
[58] Field of Search ............... 210/474, 477, 481, 482, 210/485; 426/77; 99/295

[56] References Cited

U.S. PATENT DOCUMENTS

| | | | |
|---|---|---|---|
| 2,684,624 | 7/1954 | Alvarez | 210/474 |
| 4,656,932 | 4/1987 | Kopp | 210/474 |
| 4,728,425 | 3/1988 | Sanduig | 210/477 |
| 4,735,719 | 4/1988 | Benedict | 210/474 |

Primary Examiner—Richard V. Fisher
Assistant Examiner—Wanda L. Millard
Attorney, Agent, or Firm—Gregory W. Moravan

[57] ABSTRACT

A coffee filter paper retainer which comprises a retaining member adapted to fit within the coffee filter paper in the coffee basket of a conventional automatic drip coffee maker. The retaining member is sized and shaped so that during use the coffee filter paper is sandwiched between the retaining member and the inside of the coffee basket, thereby preventing the coffee filter paper from drooping to the point that the coffee grounds spill out of the coffee filter paper into the coffee pot while the coffee maker is brewing the coffee. The retaining member can be sized and shaped to fit the coffee basket of any particular coffee maker. The coffee filter paper retainer may also further comprise a plurality of legs which extend downwardly from the retaining member. The legs are sized and shaped to support the retaining member in its desired position within the coffee filter paper, and may also assist in preventing the coffee filter paper from drooping to the point that the coffee grounds spill out of the coffee filter paper into the coffee pot while the coffee maker is brewing the coffee.

1 Claim, 2 Drawing Sheets

COFFEE FILTER PAPER RETAINER

BACKGROUND OF THE INVENTION

The present invention relates to filter paper retainers. More particularly, the present invention relates to a coffee filter paper retainer for the coffee filter paper used in the coffee basket of an automatic drip coffee maker.

SUMMARY OF THE INVENTION

Most automatic drip coffee makers have a coffee basket which requires a coffee filter paper to prevent the coffee grounds from spilling into the coffee pot through the drain hole for the brewed coffee in the bottom of the coffee basket. However, such coffee filter papers may be hard to keep properly in place in the coffee basket or may droop during use, thereby permitting the coffee grounds to wash over the upper edge portion of the coffee filter paper and fall into the coffee pot with the brewed coffee. Nobody enjoys having coffee grounds in their cup of coffee.

Thus, the primary object of the coffee filter paper retainer of the present invention is to keep the coffee filter paper properly in place and upright in the coffee basket, thereby eliminating all coffee grounds in the brewed coffee.

One form of the coffee filter paper retainer of the present invention is designed to be used with a coffee basket which has a sidewall which tapers inwardly from top to bottom. This form of the coffee filter paper retainer has a retaining member which has at least generally the same shape as the corresponding portion of the sidewall of the coffee basket with which it is adapted to be used. The retaining member is sized to have an interference fit with the tapered sidewall of the coffee basket, to enable it to sandwich an upper edge portion of the sidewall of the coffee filter paper between itself and the sidewall of the coffee basket This keeps the coffee filter paper properly in place in the coffee basket and prevents the upper edge portion of the coffee filter paper from drooping to the point where the coffee grounds will spill out of the coffee filter paper and into the coffee pot.

Optionally, this form of the invention may have a plurality of legs which, during use, extend downwardly from the retaining member inside of the coffee filter paper. The legs are sized and shaped to help support the sidewall of the coffee filter paper, to help prevent it from drooping.

Another form of the coffee filter paper retainer of the present invention is for use with coffee baskets which have a sidewall which is not tapered inwardly from top to bottom. This form of the invention comprises a retaining member which has the same shape as, and which is just slightly smaller than, the corresponding portion of the sidewall of the coffee basket with which it is adapted to be used. In addition, this form of the coffee filter paper retainer has a plurality of legs which, during use, extend downwardly from the retaining member to the inside of the bottom of the coffee filter paper. In this form of the invention the legs serve to support the retaining member in a position such that the upper edge portion of the sidewall of the coffee filter paper is sandwiched between the retaining member and the sidewall of the coffee basket. This keeps the coffee filter paper properly positioned in the coffee basket and prevents the upper edge portion of the coffee filter paper from drooping to the point where the coffee grounds will spill out of the coffee filter paper and into the coffee pot. The legs may also be sized and shaped to help support the sidewall of the coffee filter paper, to help prevent it from drooping.

In both forms of the invention, the number of legs will depend on the size of the coffee basket. In addition, the legs may be perforated to help minimize any interference which they might otherwise cause to the free flow of the brewed coffee through the sidewall of the coffee filter paper. Further, the coffee filter paper retainer is preferably sized to be a little shorter than the sidewall of the coffee filter paper. This aids in helping the coffee filter paper retainer to prevent the coffee filter paper from drooping to the point that coffee grounds are permitted to escape from the coffee filter paper. It also permits the upper edge portion of the sidewall of the coffee filter paper to stick up over the top of the coffee filter paper retainer, thereby enabling the user to easily grasp the coffee filter paper and remove it for disposal after the coffee has been brewed.

It should be understood that the foregoing is intended to be a brief, not an exhaustive, summary of the objects, features, advantages and characteristics of the present invention, since these and further objects, features, advantages and characteristics of the present invention will be directly or inherently disclosed to those skilled in the art to which it pertains by the following, more detailed description of the present invention.

DESCRIPTION OF THE PREFERRED EMBODIMENTS

Figure 1:
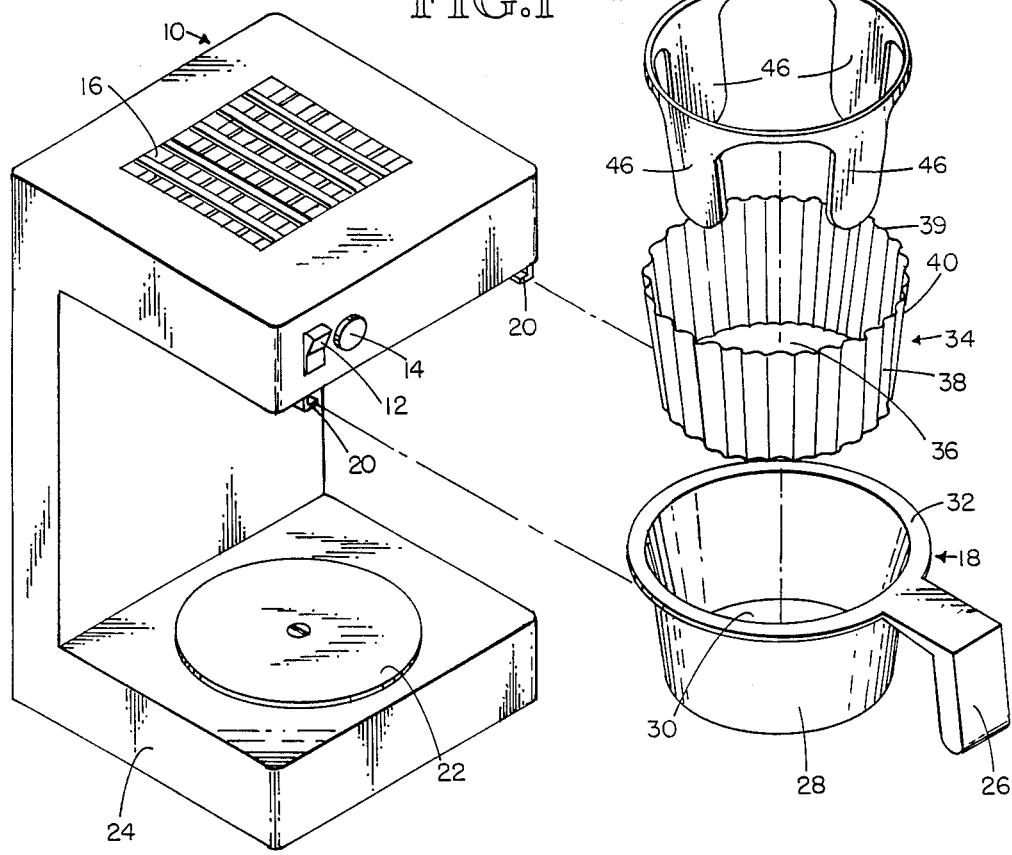
FIG. 1 is a perspective schematic view of a conventional automatic drip coffee maker, along with an exploded perspective view of the coffee maker's coffee basket, coffee filter paper and one embodiment of the coffee filter paper retainer of the present invention.

Turning now to FIG. 1, a conventional electric automatic drip coffee maker, which is generally designated at 10, is schematically illustrated. Coffee maker 10 has an on/off switch 12, a power indicator light 14, a water inlet 16, a coffee basket which is generally designated at 18, a pair of coffee basket mounting flanges 20 and a hot plate 22 in its base 24. The coffee pot for coffee maker 10 is not illustrated, for clarity. However, during use of coffee maker 10, the coffee pot would, of course, be placed on the hot plate 22 in the coffee maker's base 24.

Coffee basket 18 has a handle 26, a sidewall 28, a bottom 30 and an outwardly extending mounting flange 32. Sidewall 28 of coffee basket 18 is tapered inwardly, as seen, from its mounting flange 32 to its bottom 30. The bottom 30 of coffee basket 18 has a centrally located drain hole, not seen, through which the brewed coffee flows from coffee basket 18 into the coffee pot when the coffee is being brewed by coffee maker 10.

Figure 3:
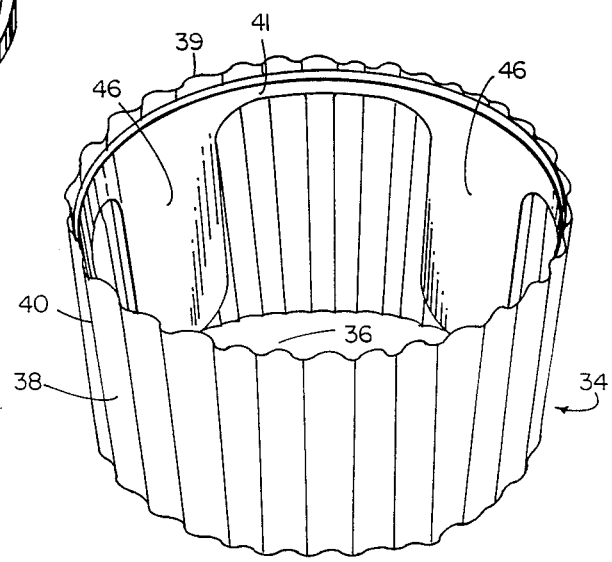
FIG. 3 is a perspective view of FIG. 1 embodiment of the coffee filter paper retainer of the present invention shown installed in a coffee filter paper.

As best seen in FIGS. 1 and 3, the coffee filter paper, generally designated at 34, has a bottom 36, a pleated sidewall 38 and a upper edge portion 40.

Since coffee maker 10, coffee basket 18 and coffee filter paper 34 are prior art and are entirely conventional in construction and use, and since they form no part, per se, of the present invention, they will not be described in further detail.

Figure 5:
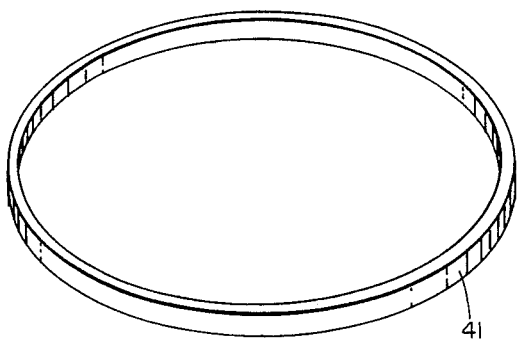
FIG. 5 is a perspective view of a further embodiment of the coffee filter paper retainer of the present invention.

The simplest form of the coffee filter paper retainer of the present invention is seen in FIG. 5, and comprises a retaining member 41 Retaining member 41 is sized to fit within coffee filter paper 34 and coffee basket 18. Retaining member 41 is preferably made from any non-toxic, corrosion proof material, such as plastic, which is compatible with coffee and with the temperatures used to brew coffee. Alternatively, it could be made from stainless steel, or from any other non-toxic, corrosion resistant metal.

The shape of retaining member 41 is selected to correspond at least generally to the shape of the corresponding portion of the coffee basket's sidewall 28 with which it is adapted to be used. Thus, of retaining member 41 were used with the coffee basket 18 seen in FIG. 1, retaining member 41 would be circular. On the other hand, if retaining member 41 were designed to be used with a coffee basket which had a square cross-sectional configuration, then it would be square. Naturally, retaining member 41 could be made in any shape which was necessary for it to conform to the cross-sectional configuration of the corresponding portion of the coffee basket with which it was adapted to be used.

The size of retaining member 41 is selected such that retaining member 41 (when in a horizontal orientation as seen in FIG. 5) has an interference fit with the coffee basket's tapered sidewall 28 at a location which corresponds to the upper edge portion 40 of the coffee filter paper's sidewall 38. The coffee filter paper's upper edge portion 40 is located a short distance below the coffee filter paper's upper edge 39.

To use retaining member 41, coffee filter paper 34 is first inserted into coffee basket 18 until its bottom 36 is on the coffee basket's bottom 30. Then retaining member 41 is inserted (in a horizontal orientation as seen in FIG. 5) into coffee basket 18 inside of coffee filter paper 34 until the coffee filter paper's upper edge portion 40 is sandwiched between retaining member 41 and the coffee basket's sidewall 28. This holds coffee filter paper 34 properly located within coffee basket 18 and keeps the coffee filter paper's upper edge portion 40 from drooping when wet to the point that the coffee grounds will spill out of coffee filter paper 34 into the coffee pot.

After coffee filter paper 34 and retaining member 41 have been installed in coffee basket 18, ground coffee is placed inside of coffee filter paper 34, after which coffee basket 18 is then installed in coffee maker 10 in the usual way by sliding the coffee basket's mounting flange 32 between the coffee maker's mounting flanges 20.

Preferably, retaining member 41 is sized and shaped so that during use the coffee filter paper's upper edge 39 extends a short distance, such as about one-half of an inch, above the top of retaining member 41. This leaves the coffee filter paper's upper edge 39 exposed above the retaining member 41, thereby enabling the user to easily grasp and remove coffee filter paper 34, as well as retaining member 41, after the coffee has been brewed The used coffee grounds and coffee filter paper 34 are then discarded. After use, retaining member 41 is washed, after which it is ready to be used again.

Figure 2:
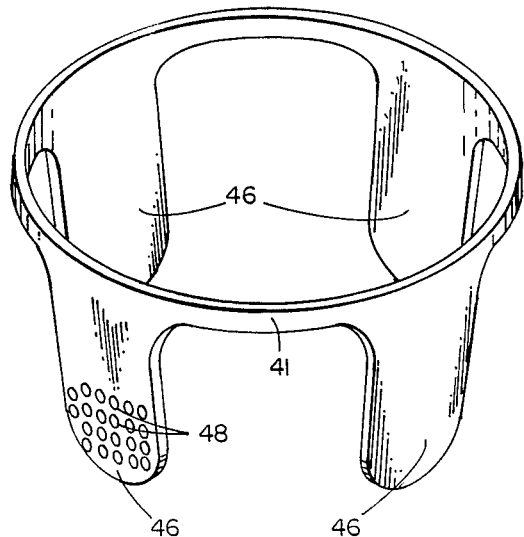
FIG. 2 is an enlarged perspective view of the FIG. 1 embodiment of the coffee filter paper retainer of the present invention.

Retaining member 41 could further comprise one or more legs 46, as seen in FIGS. 1-3, which would reach all or part of the way to the bottom 36 of coffee filter paper 34. Legs 46 would serve the purpose of helping to support the coffee filter paper's sidewall 38 to help prevent the coffee filter paper's upper edge portion 40 from drooping to the point that coffee grounds will spill out of the coffee filter paper 34 and into the coffee pot.

Preferably, legs 46 are made in one piece with, and from the same material as, retaining member 41, and are curved so that their curvature generally matches the curvature of the inside of the coffee basket's sidewall 28. In addition, if the coffee basket's sidewall 28 is tapered inwardly from top to bottom, as seen in FIG. 1, then legs 46 are also preferably tapered inwardly from top to bottom so that their taper generally matches the taper of the coffee basket's sidewall 28. Further, it is also preferred that legs 46 have relatively blunt free ends, as seen in FIGS. 1 and 3, to help prevent them from puncturing filter paper 34, even when filter paper 34 is wet. Aside from the curvature, taper and blunt free ends of legs 46 which have just been described, legs 46 may have any geometric shape.

Although four legs 46 are illustrated, it is understood that there could be fewer or more legs 46. In general, it is preferred that there be from three to eight legs 46, depending on the size of coffee basket 18. One limiting factor on the number and size of legs 46 is that legs 46 may not be so numerous or of such a size that they cover coffee filter paper 34 to such a degree that they interfere with the proper flow of brewed coffee through coffee filter paper 34. If legs 46 might otherwise interfere with the proper flow of brewed coffee through coffee filter paper 34, then one or more of legs 46 could be made with numerous perforations 48, as seen in FIG. 2, in order to permit the brewed coffee to freely flow through such perforations to reach coffee filter paper 34. Alternately, legs 46 could be replaced by one continuous perforated leg 46 which extended downwardly from retaining member 41 completely around the circumference of retaining member 41.

If the coffee basket's sidewall 28 includes internal spacing means, such as ribs, to help keep at least some portions of the coffee filter paper's sidewall 34 spaced away from the coffee basket's sidewall 28, then corresponding slots or indentations may be provided in retaining member 41 and legs 46 so that any spacing means on the inside of the coffee basket s sidewall 28 do not prevent the insertion of retaining member 41 or legs 46 inside of coffee basket 18. Alternatively, in lieu of such slots or indentations, retaining member 41 and legs 46 could be sized such that they would fit closely inside of any spacing means on the inside of the coffee basket's sidewall 28.

It is possible that some coffee baskets may have a sidewall which is not tapered, but instead extends straight down from its rim 32. In such event, it would no longer be possible for retaining member 41 to have the interference fit with coffee basket 18 which was previously described. Thus, for such coffee baskets, legs 46 for retaining member 41 would be necessary rather than optional. The length of legs 46 would be selected such that they would hold retaining member 41 in the desired position, namely a short distance below the coffee filter paper's top edge 39. In addition, legs 46 would extend straight down from retaining member 41 to the coffee filter paper's bottom 36, rather than being tapered inwardly as was previously described when the coffee basket's sidewall 28 was tapered inwardly from top to bottom. Further, retaining member 41 and legs 46 would be sized to fit closely enough within coffee basket 18 so that during use of coffee maker 10, coffee filter paper 34 would be sandwiched between the retaining member 41 and legs 46 on one side and the coffee basket's sidewall 28 on the other side. The sandwiching is made tight enough so that even when coffee filter paper 34 is wet, the upper edge portion of its sidewall 38 will not droop or sag to the point that the coffee grounds within coffee filter paper 34 will spill out of it and flow into the coffee pot.

Figure 4:
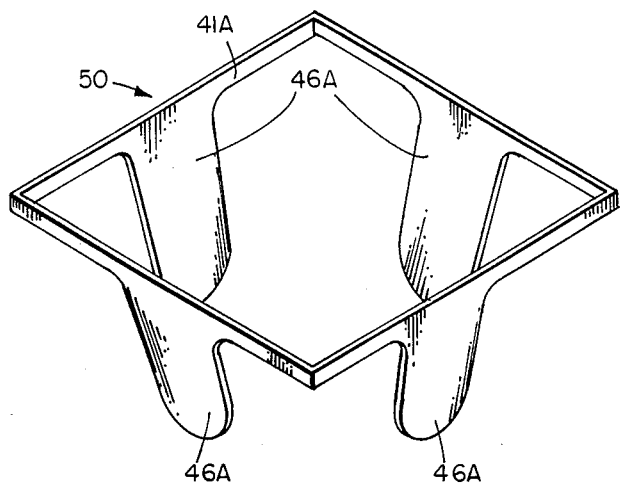
FIG. 4 is a perspective view of another embodiment of the coffee filter paper retainer of the present invention.

Turning now to FIG. 4, it illustrates another embodiment of the coffee filter paper retainer of the present invention, and is shown generally designated at 50. Coffee filter paper retainer 50 has a retaining member 41A and four legs 46A. The only difference between the coffee filter paper retainer which is shown in FIGS. 1-3 and the coffee filter paper retainer 50 shown in FIG. 4 is that retaining member 41A of coffee filter paper retainer 50 is square while the retaining member 41 shown in FIGS. 1-3 is round. Otherwise, all of the descriptions set forth above regarding the construction, operation and use of the coffee filter paper retainer shown in FIGS. 1-3 apply equally well to the coffee filter paper retainer 50 of FIG. 4.

Coffee filter paper retainer 50 has a square retaining member 41A in order to conform to the shape of some coffee baskets which have a square cross-sectional configuration. Naturally, the coffee filter paper retainer of the present invention could be made to conform to the shape of any particular coffee basket, regardless of the coffee basket's shape.

In view of the forgoing, these and further modifications, adaptations and variations of the present invention will now be apparent to those skilled in the art to which it pertains, within the scope of the following claims. It is understood that the forgoing forms of the invention were described and/or illustrated strictly by way of non-limiting example.

What is claimed is:

1. A coffee filter paper retainer adapted to be used with an automatic drip coffee maker; wherein said coffee maker is for brewing a quantity of brewed coffee; wherein said coffee maker comprises a coffee basket, a coffee filter paper in said coffee basket for holding a quantity of coffee grounds, and a coffee pot for holding said quantity of brewed coffee after it has been brewed by said coffee maker; wherein said coffee filter paper has a bottom and a sidewall extending upwardly from said bottom; and wherein said coffee filter paper retainer comprises:

a retaining member means; and at least one leg means extending downwardly from said retaining member means;

wherein said retaining member means and said leg means are sized and shaped to be adapted to fit within said coffee filter paper in said coffee basket; wherein, during use of said coffee filter paper retainer, at least a portion of said sidewall of said coffee filter paper is sandwiched between said coffee basket and at least one of said retaining member means and said leg means; wherein, during use of said coffee maker to make coffee, at least one of said retaining member means and said leg means are for preventing said sidewall of said coffee filter paper from doping to the point where said coffee grounds spill over said sidewall of said coffee filter paper and into said brewed coffee in said coffee pot; and wherein at least one of said leg means is perforated, to permit said brewed coffee to pass through said at least one of said leg means to said coffee filter paper.

* * * * *